United States Patent [19]
Sinha et al.

[11] Patent Number: 6,132,794
[45] Date of Patent: *Oct. 17, 2000

[54] INFUSION-DRYING OF CARROTS

[75] Inventors: Nirmal K. Sinha; Steve D. Nugent; Duane C. Nugent, all of Frankfort, Mich.

[73] Assignee: Graceland Fruit Cooperative, Inc., Frankfort, Mich.

[*] Notice: This patent issued on a continued prosecution application filed under 37 CFR 1.53(d), and is subject to the twenty year patent term provisions of 35 U.S.C. 154(a)(2).

[21] Appl. No.: 09/013,179

[22] Filed: Jan. 26, 1998

[51] Int. Cl.⁷ .......................................................... A23L 1/09
[52] U.S. Cl. ........................ 426/615; 426/321; 426/425; 426/426; 426/443; 426/639; 426/640
[58] Field of Search ..................... 426/615, 639, 426/640, 443, 321, 425, 426

[56] References Cited

U.S. PATENT DOCUMENTS

| | | | |
|---|---|---|---|
| 2,420,517 | 5/1947 | Brandner et al. | 426/639 |
| 2,785,071 | 3/1957 | Mathews | 426/639 |
| 4,256,772 | 3/1981 | Shanbhag et al. . | |
| 4,542,033 | 9/1985 | Agarwala . | |
| 4,551,348 | 11/1985 | O'Mahoney et al. . | |
| 4,713,252 | 12/1987 | Ismail . | |
| 5,000,972 | 3/1991 | Nafisi-Movaghar . | |
| 5,320,861 | 6/1994 | Mantius et al. | 426/599 |

OTHER PUBLICATIONS

Osmotic Dehydration of Fruit, Dannila Torreggiani, Elisabetta Forni and Anna Rixxolo, Journal of Food Processing & Preservation 12 (1987), pp. 27–44.

Microbial Stability as Affected by Water Activity, Larry R. Beuchal, Ph.D., Cereal Foods World, Jul. 1981, vol. 26, No. 7, pp. 345–349.

Osmotic Dehydration of Fruit: Influence of Osmotic Agents on Drying Behavior and Product Quality, C.R. Lerici, G. Pinnavaia, M. Dalla Rosa and L. Bartolucci, Journal of Food Science, vol. 50 (1985), pp. 1217–1220.

*Primary Examiner*—Helen Pratt
*Attorney, Agent, or Firm*—Price, Heneveld, Cooper, DeWitt & Litton

[57] ABSTRACT

A process for infusion-drying carrots comprises immersing the carrots in a circulating bath of infusion syrup, the infusion syrup comprising water and infusion solids, the infusion solids comprising at least 20 weight percent corn syrup and the balance, if any, sugar, until the carrots attain a Brix from about 25 degrees to about 50 degrees, separating the infused carrots from the infusion syrup, and drying the infused carrots, by directing a stream of hot air over and through the infused carrots, the hot air having a temperature from about 140 degrees F. to about 200 degrees F., until the infusion-dried carrots attain a water activity from about 0.30 to about 0.63.

21 Claims, No Drawings

INFUSION-DRYING OF CARROTS

FIELD OF THE INVENTION

This invention relates generally to a process for the infusion-drying of carrots. More particularly, the invention is directed to a process for treating carrots with an infusion syrup, and drying the infused carrots under specific conditions, to prepare infusion-dried carrots which have carrot-like color and taste.

BACKGROUND OF THE INVENTION

Various methods for infusing vegetables with sugar and other infusion syrups are well-known. Early methods of infusing vegetables included simply storing the vegetables in a sugar/water solution, within a container. When the container was later opened, it was observed that the water had been extracted from the vegetables and sugar had been infused into the vegetables. These batch processes were accomplished on a larger scale by charging several hundred gallons of a high Brix syrup (45 degrees to 67 degrees) to a large tank, circulating the syrup through the tank, adding more sugar to the syrup, heating the syrup to a temperature from about 100 degrees F. to about 200 degrees F., then immersing the vegetables therein. Typically, the syrup was circulated over and through the bed of vegetables, and the temperature of the system was lowered to an infusion temperature between about 60 degrees F. and about 110 degrees F., depending upon the type of vegetables being infused. This combination of vegetables and syrup was maintained within the tank for a period of time ranging from about 3 to about 12 hours. At the end of this time period, the concentration of sugar in the syrup and the vegetables would be nearly equal, i.e., within about 5 degrees to about 15 degrees Brix of each other. Thus, the vegetables would have been infused with sugar to a level of perhaps 40 degrees to about 52 degrees Brix, depending upon the type of vegetables being infused. After the infused vegetables were removed from the infusion apparatus, the spent infusion syrup was reconcentrated by the evaporation of water therefrom and recycled back to the tank to begin the batch process again. Batch infusion processes are disclosed in U.S. Pat. No. 5,000,972 to Nafisi-Movaghar, U.S. Pat. No. 4,713,252 to Ismail, U.S. Pat. No. 4,551,348 to O'Mahony et al, U.S. Pat. No. 4,542,033 to Agarwala, U.S. Pat. No. 4,626,434 to O'Mahony et al, and U.S. Pat. No. 4,256,772 to Shanbhag et al.

Recently, continuous processes for infusing vegetables have been developed. U.S. Pat. No. 5,320,861 to Mantius et al discloses a process for infusing produce with sugar by a continuous process.

Carrots are a particularly desirable vegetable for infusing. Carrots are an excellent source of beta carotene, and are also high in dietary fiber. The bright orange color, sweet taste, and suitability as a snack, salad component, canned vegetable, and food ingredient for soups, cereals, and bakery products, make carrots a prime choice for infusion processing, to produce a value added vegetable product.

It is noted that other methods for preserving carrots, i.e., dehydration, where high heat levels are applied directly to the vegetable, can adversely affect the color and texture of the resultant dried carrots.

It would be desirable to develop an improved process for the infusion-drying of carrots, said process resulting in a product having an extended shelf life, a bright orange carrot-like color, and the taste of fresh carrots.

SUMMARY OF THE INVENTION

Accordant with the present invention, there surprisingly has been discovered an improved process for the infusion-drying of carrots. The process comprises the steps of:

immersing the carrots in a circulating bath of infusion syrup, the infusion syrup comprising water and infusion solids, the infusion solids comprising at least 20 weight percent corn syrup and the balance, if any, sugar, until the carrots attain a Brix from about 25 degrees to about 50 degrees;

separating the infused carrots from the infusion syrup; and drying the infused carrots by directing a stream of hot air over and through the infused carrots, the hot air having a temperature from about 140 degrees F. to about 200 degrees F., until the infusion-dried carrots attain a water activity from about 0.30 to about 0.63.

The process of the present invention is particularly suited for the infusion-drying of carrots, to prepare a food product which may be eaten as a snack, mixed with dry breakfast cereals, added to cake mixes, muffins, bagels, waffles, trail mixes, confections, and the like.

DESCRIPTION OF THE PREFERRED EMBODIMENTS

The present invention is directed to a process for infusion-drying carrots. The process comprises immersing the carrots in a circulating bath of infusion syrup, the infusion syrup comprising water and infusion solids, the infusion solids comprising at least 20 weight percent corn syrup and the balance, if any, sugar, until the carrots attain a Brix from about 25 degrees to about 50 degrees, separating the infused carrots from the infusion syrup, and drying the infused carrots by directing a stream of hot air over and through the infused carrots, the hot air having a temperature from about 140 degrees F. to about 200 degrees F.

The infusion-drying process according to the present invention, where the carrots are first infused with a specific infusion syrup and then dried in a controlled manner, has several technical advantages over similar processes disclosed in the prior art. The inventive infusion-drying process results in carrots which have a shelf life comparable to carrots prepared by the simple drying technique. However, the taste, color, texture, and nutritive value of the carrots prepared by the inventive infusion-drying process are not compromised as in conventional drying. The infusion-dried carrots according to the present invention are soft and tender, thereby facilitating the slicing or dicing of the carrots to produce ingredients for various food applications. This process effectively depresses the water activity of the carrots to a level at which most bacteria will not grow. Thus, the infusion-dried carrots are rendered microbiologically stable and need not be refrigerated or frozen.

The first step of the infusion-drying process involves immersing the carrots in a circulating bath of infusion syrup. The carrots may be whole carrots, or may be pieces of carrots that have been sliced or diced from whole carrots. Carrots of any size may be used in the practice of the present invention, but preferably, the carrots are sliced or diced carrots ranging in size from about one-eighth inch to about one inch. Additionally, the carrots may be fresh carrots, or may be quick frozen carrots. The carrots are immersed in the bath of infusion syrup by any conventional method, such as for example, by pouring the carrots into a tank which has previously been filled with the infusion syrup. The infusion syrup is then circulated through the bed of carrots by any conventional method, such as for example, by pumping a stream of the infusion syrup from the bottom of the immersion tank and reintroducing the stream of infusion syrup back to the top of the tank. The infusion syrup is circulated throughout the bed of carrots for a period of time sufficient to cause the Brix of the infused carrots to reach a level of from about 25 degrees to about 50 degrees. The ratio of infusion syrup to carrots on a weight basis may range over wide limits. Preferably, the ratio of infusion syrup to carrots ranges from about 1:1 to 2:1.

Although the infusion process has been described herein as a batch process, those ordinarily skilled in the art will readily recognize that the infusion step of the inventive process may be accomplished using a continuous infusion process. Suitable methods for continuously infusing fruits and vegetables are more fully set forth in allowed U.S. patent application Ser. No. 08/709,727 which is incorporated in its entirety herein by reference thereto.

The infusion syrup, according to the present invention, comprises water and infusion solids, and has a Brix from about 50 degrees to about 77 degrees. The Brix scale is a hydrometer scale for infusion solutions, so graduated that its reading at a particular temperature represents the percentage by weight of the measured infusion solution. The temperature of the infusion syrup is maintained within a range from about 40 degrees F. to about 100 degrees F. The infusion solids comprise at least 20 weight percent corn syrup and the balance, if any, sugar. Thus, the infusion syrup may consist of corn syrup alone. By the term "corn syrup" is meant a mixture of D-glucose, maltose, and maltodextrins prepared by the hydrolysis of cornstarch, utilizing the action of acids or enzymes. By the term "sugar" is meant a sweetener comprising fructose, sucrose, dextrose, or a mixture thereof. As the infusion process proceeds, the Brix of the infusion syrup decreases and the Brix of the infused carrots increases, until the carrots attain a Brix level of from about 25 degrees to about 50 degrees.

Thereafter, the infused carrots are separated from the infusion syrup. This may be accomplished by any conventional method, such as for example, by draining the infusion syrup from the bed of infused carrots. The spent infusion syrup may be rejuvenated for further use in infusing another batch of carrots, by evaporating water from the spent infusion syrup and adding sugar and/or corn syrup thereto.

The infused carrots are dried, according to the present invention, by directing a stream of hot air over and through the infused carrots. In order to facilitate this process, the carrots may be deposited and evenly spread over a perforated pan or belt which is thereafter placed into a conventional convection oven. The hot air, thus, may pass over and through the bed of carrots, thence through the perforations. The hot air must be maintained within a specific range of temperatures in order to effect the proper drying of the infused carrots, to achieve the desired carrot water activity while insuring a carrot-like taste and bright orange color in the final product. The hot air temperature ranges from about 140 degrees F. to about 200 degrees F. The drying step is continued until the carrots attain a water activity from about 0.30 to about 0.63. As will be readily apparent to one ordinarily skilled in the art, the drying operation may be carried on either batch-wire or as a continuous process.

The infusion-drying process of the present invention results in a low water activity in the finished carrot product. The recited water activity levels of from about 0.30 to about 0.63 are below the threshold water activity for mold growth. Moreover, the ingredients of the inventive infusion syrup are critical when attempting to dry the infused carrots. Infusion syrups containing sugar alone or high amounts of sugar result in infused carrots which can not be dried to a water activity below about 0.75 because of severe "case hardening" of the final product. Case hardening is a phenomenon in which sugar solutes are drawn out of the carrots to coat the outer surfaces of the carrots during the drying step. Case hardening restrains the normal removal of water from the carrots during the drying step. Carrots made by an infusion-drying process in which a high sugar content infusion syrup is used may become moldy within one month, due to the high residual water activity caused by case hardening.

EXAMPLES

Carrots are infused utilizing infusion syrups containing the approximate weight percentages of the ingredients set forth in Table I. In each case, approximately 1.5 pounds of carrots are infused using approximately 2.0 pounds of infusion syrup having a Brix of about 55 degrees. The carrots are infused in a circulating bath of the infusion syrup until the carrots attain a Brix of about 33 degrees. Infusion is carried out at a temperature of about 47 degrees F. Following infusion, the carrots are drained for a period of about 10 minutes, then spread onto a perforated pan. Hot air at a temperature of about 145 degrees F. is passed over and through the bed of infused carrots until the carrots attain a water activity of about 0.47.

TABLE 1

| Example # | % Sugar | % Corn Syrup | Product |
| --- | --- | --- | --- |
| Comparison 1 | 100 | 0 | Case Hardened |
| Comparison 2 | 90 | 10 | Case Hardened |
| Example 1 | 80 | 20 | Good |
| Example 2 | 70 | 30 | Good |
| Example 3 | 60 | 40 | Good |
| Example 4 | 50 | 50 | Good |
| Example 5 | 40 | 60 | Good |
| Example 6 | 30 | 70 | Good |
| Example 7 | 20 | 80 | Good |
| Example 8 | 10 | 90 | Good |
| Example 9 | 0 | 100 | Good |

Comparisons 1 and 2 are case hardened, and therefore, not able to attain a water activity below 0.63. The Comparisons are overly sweet, overly moist, and candy-like. Examples 1 through 9 have an extended shelf life, and have a bright orange color and carrot-like taste.

These Examples may be repeated with similar success by substituting the generically or specifically described materials and process conditions recited herein for those set forth in the preceding Example.

The process for infusion-drying carrots described hereinabove is generally disclosed in terms of its broadest application to the practice of the present invention. Occasionally, however, the materials and process conditions as described may not be precisely applicable all types of carrots included in the disclosed scope. Those instances where this occurs will readily be recognized by those ordinarily skilled in the art. In all such cases, the process may successfully be performed by routine modifications to the disclosed process, e.g., by using higher or lower Brix infusion syrups, by using alternate infusion temperatures, etc., or other modifications which are otherwise conventional may be employed.

The invention is more easily comprehended by reference to the specific embodiments recited hereinabove which are representative of the invention. It must be understood, however, that the specific embodiments are provided only for the purpose of illustration, and that the invention may be practiced otherwise than as specifically illustrated without departing from its spirit and scope.

What is claimed is:

1. A process for infusion-drying carrots, comprising the steps of:

immersing the carrots in a circulating bath of infusion syrup, said infusion syrup comprising water and infusion solids, said infusion solids comprising at least 20 weight percent corn syrup and the balance, if any, sugar, until the carrots attain a Brix from about 25 degrees to about 50 degrees;

separating the infused carrots from the infusion syrup; and drying the infused carrots, by directing a stream of hot air over and through the infused carrots, said hot air having a temperature from about 140 degrees F. to about 200 degrees F., until the infusion-dried carrots attain a water activity from about 0.30 to about 0.63.

2. The process for infusion-drying carrots according to claim 1, wherein the carrots comprise pieces of carrots having sizes ranging from about one-eighth inch to about one inch.

3. The process for infusion-drying carrots according to claim 1, wherein the immersed carrots are frozen carrots.

4. The process for infusion-drying carrots according to claim 1, wherein the bath of infusion syrup is circulated by pumping a stream of the infusion syrup from the bottom of an immersion tank and reintroducing the stream of the infusion syrup back to the top of the tank.

5. The process for infusion-drying carrots according to claim 1, wherein the ratio of infusion syrup to carrots on a weight basis ranges from about 1:1 to 2:1.

6. The process for infusion-drying carrots according to claim 1, wherein the infusion syrup has a Brix from about 50 degrees to about 77 degrees.

7. The process for infusion-drying carrots according to claim 1, wherein the temperature of the infusion syrup ranges from about 40 degrees F. to about 100 degrees F.

8. The process for infusion-drying carrots according to claim 1, wherein the sugar comprises fructose, sucrose, dextrose, or a mixture thereof.

9. The process for infusion-drying carrots according to claim 1, wherein the infusion syrup consists of corn syrup.

10. The process for infusion-drying carrots according to claim 1, wherein the infusion syrup is rejuvenated by evaporating water from said infusion syrup and adding sugar and/or corn syrup thereto.

11. The process of claim 1 in which said infusion solids comprise sugar and corn syrup in a percent by weight ratio of from 80:20 to 10:90.

12. The process for infusion-drying carrots according to claim 11, wherein the ratio of infusion syrup to carrots on a weight basis ranges from about 1:1 to 2:1.

13. The process for infusion-drying carrots according to claim 12, wherein the infusion syrup has a Brix from about 50 degrees to about 77 degrees.

14. The process for infusion-drying carrots according to claim 13, wherein the temperature of the infusion syrup ranges from about 40 degrees F. to about 100 degrees F.

15. A process for infusion-drying carrots, comprising the steps of:

providing pieces of carrots having sizes ranging from about one-eighth inch to about one inch;

immersing the carrots in a circulating bath of infusion syrup, the ratio of infusion syrup to carrots on a weight basis ranging from about 1:1 to about 2:1, said infusion syrup having a Brix from about 50 degrees to about 77 degrees, said infusion syrup having a temperature from about 40 degrees F. to about 100 degrees F., said infusion syrup comprising water and infusion solids, said infusion solids comprising at least 20 weight percent corn syrup and the balance, if any, sugar, said sugar comprising fructose, sucrose, dextrose, or mixtures thereof, until the carrots attain a Brix from about 25 degrees to about 50 degrees;

separating the infused carrots from the infusion syrup; and drying the infused carrots, by directing a stream of hot air over and through the infused carrots, said hot air having a temperature from about 140 degrees F. to about 200 degrees F., until the infusion-dried carrots attain a water activity from about 0.30 to about 0.63.

16. The process for infusion-drying carrots according to claim 15, wherein the immersed carrots are frozen carrots.

17. The process for infusion-drying carrots according to claim 15, wherein the bath of infusion syrup is circulated by pumping a stream of the infusion syrup from the bottom of an immersion tank and reintroducing the stream of the infusion syrup back to the top of the tank.

18. The process for infusion-drying carrots according to claim 15, wherein the infusion syrup comprises corn syrup.

19. The process for infusion-drying carrots according to claim 15, wherein the infusion syrup is rejuvenated by evaporating water from said infusion syrup and adding sugar and/or corn syrup thereto.

20. The process of claim 15 in which said infusion solids comprise sugar and corn syrup in a percent by weight ratio of from 80:20 to 10:90.

21. The process for infusion-drying carrots according to claim 20, wherein the sugar comprises fructose, sucrose, dextrose, or a mixture thereof.

* * * * *